United States Patent [19]
Satoh et al.

[11] Patent Number: 5,641,916
[45] Date of Patent: Jun. 24, 1997

[54] TORQUE SENSOR

[75] Inventors: Kouichi Satoh; Kazuo Chikaraishi, both of Gunma, Japan

[73] Assignee: NSK Ltd., Tokyo, Japan

[21] Appl. No.: 558,265

[22] Filed: Nov. 13, 1995

[30] Foreign Application Priority Data

Nov. 14, 1994 [JP] Japan .................................. 6-302731

[51] Int. Cl.$^6$ ...................................................... G01L 3/00
[52] U.S. Cl. .............................. 73/862.331; 73/862.325
[58] Field of Search ...................... 73/862.23, 862.331, 73/862.332, 862.333, 862.334, 862.335

[56] References Cited

U.S. PATENT DOCUMENTS

| | | | |
|---|---|---|---|
| 3,858,443 | 1/1975 | Roberts, III et al. | 73/862.331 |
| 5,307,690 | 5/1994 | Hanazawa | 73/862.33 |
| 5,406,834 | 4/1995 | Taniguchi | 73/118.1 |

*Primary Examiner*—George M. Dombroske
*Assistant Examiner*—Ronald Biegel
*Attorney, Agent, or Firm*—Sughrue, Mion, Zinn, Macpeak & Seas

[57] ABSTRACT

A torque sensor is provided with a pair of coils whose inductances vary in opposite directions in accordance with torque, and a differential amplifier circuit for differentially amplifying a pair of detection voltages induced by and received from the pair of coils so as to detect the torque by means of the output of the differential amplifier circuit. The torque sensor further includes a detection circuit using the detection voltage as an input to send out a detection signal when the input exceeds a predetermined upper limit value or becomes lower than a predetermined lower limit value, and a control circuit for controlling the differential amplifier circuit on receiving the detection signal so that the output of the differential amplifier circuit has a predetermined value outside a steady output range.

12 Claims, 5 Drawing Sheets

TORQUE SENSOR

BACKGROUND OF THE INVENTION

The present invention relates to a torque sensor and more particularly to a torque sensor having coils for detecting torque and fit for use in a vehicular power steering system in which irregularities resulting from the inadequate connection of the coils and the like are detected.

With respect to the prior art, U.S. Pat. No. 5,406,834 discloses a type of torque sensor mentioned above.

In the conventional apparatus, the torque sensor is designed to detect torque by first applying oscillating voltage to a torque detecting coil and a temperature compensating coil, and differentially amplifying the voltages detected from these coils. A reference voltage generated by dividing resistance voltage is applied in the forward direction via diodes to one of the differential inputs. In this torque sensor, when the detection voltage becomes lower than the reference voltage as the oscillating voltage applied to the coils dies out because an oscillation circuit malfunctions, since one of the differential inputs is maintained at the reference voltage, the balance between the differential inputs is broken. Then the output subjected to the differential amplification is forced to vary from a predetermined range, whereby the malfunction of the oscillating circuit can be detected from the output thus subjected to the differential amplification. By merely differentially amplifying and outputting the detection voltage from the coils, because both the differential inputs lower when the oscillating voltage dies out, the output after the differential amplification is not usable to determine the irregularity of the oscillating voltage.

The dying out of the oscillating voltage resulting from the malfunction of the oscillation circuit has made been made detected with certainty by means of the outputs of the differential amplifier circuits in the conventional torque sensor.

However, there are various kinds of irregularities of torque sensors, and some of the irregularities other than those resulting from the malfunction of the oscillation circuit still remain undetected in the apparatus where only the output is subjected to differential amplification because both the differential inputs vary together. For example, there arise irregularities in cases where a connector provided between the coils and the oscillation circuit is disconnected, where the lead wire of the coil is broken partly because a coil yoke holding the coil is turned, and where the lead wire of the coil is broken when the coils are loaded. In these cases, both coils are not connected, which is equivalent to a case where infinite inductance is electrically connected. When the oscillating voltage in this condition is supplied, it is directly detected and the detection voltages are caused to have a great value; that is, no output irregularity appears even when the pair of detection voltages are differentially amplified. Since the oscillating voltage is being supplied, the irregularity is not detected by the conventional torque sensor which operates on the basis of the dying out of the oscillating voltage. Therefore, the problem is that the control circuit for receiving the outputs of the differential amplifier circuits and the like are not capable of deciding whether or not such an irregularity exists in the torque sensor by only monitoring the outputs of the differential amplifier circuits

SUMMARY OF THE INVENTION

An object of the present invention made in view of the foregoing unsolved problems of the prior art is to provide a torque sensor capable of deciding the presence of irregularities including those such as defective connection of coils in which a pair of detection voltages vary similarly, by means of the outputs of differential amplifier circuits.

In order to accomplish the object above, a torque sensor comprising a pair of coils whose inductances vary in opposite directions in accordance with torque, and a differential amplifier circuit for receiving and differentially amplifying a pair of detection voltages induced by the pair of coils so as to detect the torque by means of the output of the differential amplifier circuit, includes a first detection circuit using one of the detection voltages in pair as an input to send out a detection signal when the input exceeds a predetermined upper limit value or becomes lower than a predetermined lower limit value, and a control circuit for controlling the differential amplifier circuit on receiving the detection signal from the detection circuit so that the output of the differential amplifier circuit has a predetermined value outside a steady output range.

The torque sensor may further include a second detection circuit using the other of the detection voltages, which is similar to the first detection circuit.

The predetermined upper limit value is set to an upper limit value within the range of normal variations of the detection voltages applied to the detection circuit or what is greater than that upper limit value. Moreover, the predetermined lower limit value is set to a lower limit value within the range of normal variations of the detection voltages applied thereto or what is smaller than that lower limit value.

The torque sensor thus arranged according to the present invention functions when the coils are defectively connected because of the disconnection of the lead wires of the coils as follows: When both the coils remain unconnected first, this is equivalent to a case where coils having infinite inductance are connected as viewed from a circuit to which the coils are originally connected. In other words, it appears as if the inductance of both coils greatly varies beyond the original range in which their inductance is variable according to the torque involved. Then the pair of detection voltages correspondingly have values greater than normal. On the other hand, the detection circuit thus provided according to the present invention sends out the detection signal to the control circuit when the torque detection voltage becomes abnormally greater than the predetermined upper limit value. Then the control circuit forces the output of the differential amplifier circuit to vary into the predetermined value outside the steady output range. When there exist coils defectively connected, the irregular condition is reflected on the outputs subjected to differential amplification and the output of the differential amplifier circuit is set outside the predetermined range, whereby a control circuit and the like, which receive the output of the differential amplifier, are allowed to decide the presence of absence of such an irregularity in the torque sensor, depending on whether the outputs of the differential amplifier circuits are within the predetermined range.

Consequently, according to the torque sensor of the present invention, it is possible to determine whether any irregularities exist, including those such as defective connection of the coils in which the pair of detection voltages similarly vary.

DETAILED DESCRIPTION OF THE INVENTION

Figure 1:
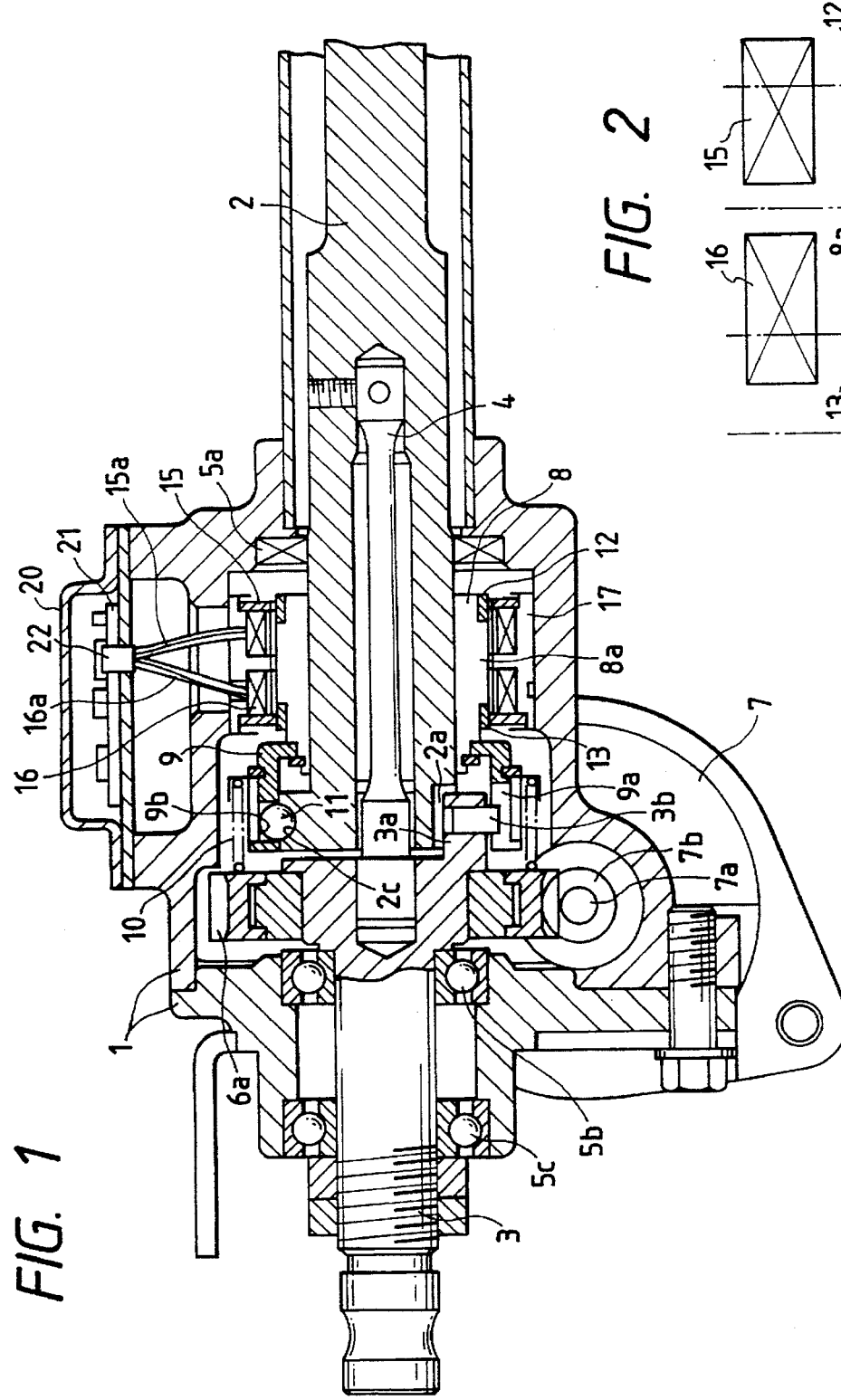
FIG. 1 is a sectional view showing the mechanical construction of a torque sensor embodying the present invention.

Referring to the drawings, preferred embodiments of the present invention will subsequently be described.

FIG. 1 is a sectional view showing the overall constitution of an embodiment of the present invention. FIG. 1 refers to a case where a torque sensor according to the present invention is applied to an electric power steering system for a vehicle and is to be used for detecting the torque developed in a steering system. More specifically, the torque sensor is designed to detect steering torque in the form of an electric signal by converting rotational displacement resulting from the steering torque to axial linear displacement and by utilizing the relationship that coil inductance varies correspondingly with the displacement.

The mechanical construction will first be described. An input shaft 2 and an output shaft 3 coupled together via a torsion bar 4 are rotatably supported by bearings 5a, 5b and 5c in a housing 1. The input and output shafts 2, 3 and the torsion bar 4 are arranged coaxially.

A steering wheel is integrally and rotatably fit to the right end side (not shown in FIG. 1) of the input shaft 2, whereas a pinion shaft which forms, for example, a known rack-and-pinion type steering unit is coupled to the left end side (not shown in FIG. 1) of the output shaft 3. Consequently, the steering force generated when the driver turns the steering wheel is transmitted to a steered wheel (not shown) via the input shaft 2, the torsion bar 4, the output shaft 3 and the rack-and-pinion type steering unit.

Moreover, there is formed a protrusion 3a projecting toward the input shaft 2 in a predetermined position in the circumferential direction of the right edge face portion of the output shaft 3. The protrusion 3a is fitted into a longitudinal groove 2a which is formed on the outer peripheral face at the left end of the input shaft 2 and wider than the protrusion 3a, whereby the protrusion 3a is prevented from making relative rotation exceeding a predetermined range (e.g., approximately ±5 degrees) between the input shaft 2 and the output shaft 3.

A worm wheel 6 which coaxially rotates together with the output shaft 3 embraces the output shaft 3, and a worm 7b formed on the outer peripheral face of the output shaft 7a of an electric motor 7 engages with the worm wheel 6. Therefore, the torque of the electric motor 7 is transmitted to the output shaft 3 via the output shaft 7a, the worm 7b and the worm wheel 6, so that steering auxiliary torque in any given direction is applied to the output shaft 3 by properly switching the direction of rotation of the electric motor 7.

Further, a cylindrical slider 8 capable of relative displacement in both the axial and rotational directions with respect to the input shaft 2 embraces the input shaft 2, and the end portion of a cylindrical cross guide 9 close to the protrusion 3a is coupled to the left end portion of the slider 8. A longitudinal groove 9a extending in the axial direction is formed in a portion opposite to the protrusion 3a on the inner peripheral face of the cross guide 9, and the outer end of a pin 3b is inserted in the longitudinal groove 9a. The inner end of the pin 3b is pressed into the protrusion 3a and the outer end is projected outside in the diametric direction.

Consequently, the output shaft 3 and the slider 8 are integral with each other in the rotational direction but allowed to be relatively and axially displaced within the range of length of the longitudinal groove 9a.

The slider 8 is so arranged that it is normally urged rightward by a spring 10. However, the axial movement of the slider 8 is regulated because a ball 11 rotatably housed in a recess 9b formed in the inner peripheral face of the cross guide 9 set apart about 180° C. from the longitudinal groove 9a in the circumferential direction is allowed to step into a groove 2c which is formed on the outer peripheral face on the left end side of the input shaft 2 and continuous in the circumferential direction. As the groove 2c is slightly inclined with respect to the shaft, the relative rotation is produced between the input shaft 2 and the output shaft 3 with the distortion of the torsion bar 4. When the position of the slide 8 in the rotational direction with respect to the input shaft 2 varies, the ball 11 is caused to move axially along the groove 2c, whereby the slider 8 is moved axially.

The slider 8 according to this embodiment of the invention is made of magnetic material (e.g., iron), and a large-diameter portion 8a axially covering a predetermined distance is axially formed in the central portion of the slider 8. Relatively thin-wall ring members 12 and 13 made of conductive and non-magnetic material (e.g., aluminum) are externally fitted to the slider 8 to hold the large-diameter portion 8a axially therebetween. In this case, the ring members 12 and 13 are made of the same material and are so thick as to fill up a difference in level on both ends of the large-diameter portion 8a.

Thus, one region made of conductive and non-magnetic material (the ring members 12, 13) and the other region made of magnetic material (the large-diameter portion 8a), are formed on the outer peripheral face of the slider 8.

Further, a pair of coils 15, 16 which are axially separated from each other and equal in product standard are arranged on the inner peripheral face of the housing 1 so as to surround the outer peripheral face of the slider 8. More specifically, the coils 15, 16 are coaxially held on the inner peripheral face of a bobbin 17, which is forced to be inserted into the inner peripheral face of the housing 1.

Figure 2:
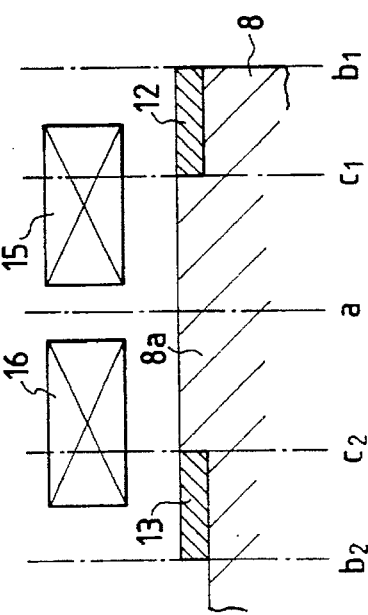
FIG. 2 is an enlarged view of the principal part of FIG. 1.

FIG. 2 is an enlarged sectional view illustrating the positional relation between the slider 8 and the coils 15, 16 while the slider 8 is located at the neutral position (the position at which the steering torque is zero) within the longitudinal moving range of the slider 8. As shown in FIG. 2, the positional relation between the slider 8 and the coils 15, 16 is as follows: the central position a in the axial direction of the large-diameter portion 8a is located halfway between the coils 15, 16; the axial external edge face position b1, b2 of the ring members 12, 13 are each located outside the axial outer ends of the coils 15, 16; the boundary c1 between the large-diameter portion 8a and the ring member 12 is located inside the coil 15; and the boundary c2 between the large-diameter portion 8a and the ring member 13 is located inside the coil 16.

According to this embodiment of the invention, the axial dimensions (b1–c1, b2–c2) of the ring members 12, 13 are such that, over the whole longitudinal moving range of the slider 8, the edge face positions b1, b2 are each always located outside the axial outer ends of the coils 15, 16, whereas the boundary positions c1, c2 are each located inside the coils 15, 16. More specifically, the axial external edge face positions of the coils 15, 16 while the slider 8 is located at the neutral position are adjusted to the axial central position of the ring member 12 or 13, and the distances from the edge face positions of the coils to both end positions of the ring members 12, 13 are each set longer than the maximum moving distance of the slider 8 from the neutral position so that the aforementioned dimensional relations are satisfied.

A sensor case cover 20 secured to the housing 1 accommodates a circuit board 21, which is mounted with the circuit portion of the torque sensor. Moreover, lead wires 15a, 16a of the coils 15, 16 are connected to a connector 22, which is fixed to a corresponding connector on the circuit board 21, whereby the pair of coils 15, 16 whose inductance varies in accordance with the torque such as steering torque are connected via the connector 22 to the torque sensor circuit.

Figure 3:
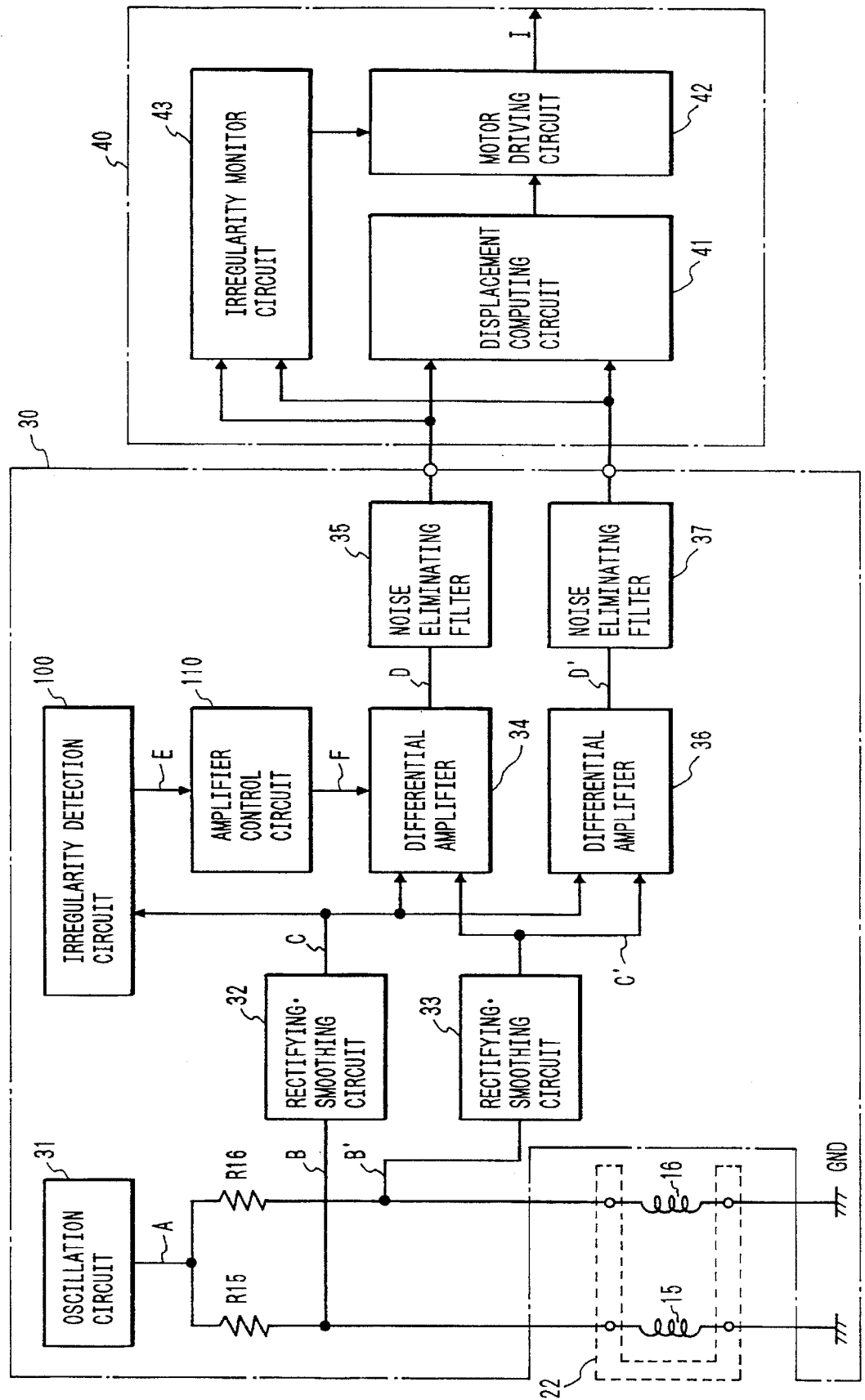
FIG. 3 is a block diagram showing a motor control circuit arrangement centering on the circuit portion of the torque sensor according to the present invention.

A circuit configuration of such a torque sensor will be described. FIG. 3 is a block diagram of a circuit portion 30 in the torque sensor, the circuit portion 30 including an oscillation circuit 31 for supplying to the coils 15, 16 alternating current having a predetermined frequency; a rectifying•smoothing circuit 32 for rectifying and smoothing a voltage signal generated by the self-induction electromotive force of the coil 15 and outputting the resulting signal; a rectifying•smoothing circuit 33 for rectifying and smoothing a voltage signal generated by the self-induction electromotive force of the coil 16 and outputting the resulting signal; differential amplifiers (differential amplifier circuits) 34, 36 for each amplifying and outputting the difference between the outputs of the rectifying•smoothing circuits 32, 33; a noise eliminating filter 35 for eliminating external noise components contained in the output of the differential amplifier 34; a noise eliminating filter 37 for eliminating external noise components contained in the output of the differential amplifier 36; an irregularity detection circuit (detection circuit) 100 for receiving the output voltage of the rectifying•smoothing circuit 32 and sending out an irregularity detection signal when an input value is outside a predetermined input range; and an amplifier control circuit (control circuit) 110 for forcing the output of the differential amplifier 34 to have a value at a low level outside a predetermined steady output range on receiving the irregularity detection signal.

Another irregularity detection circuit 100' (shown by dotted line in FIG. 4), which is similar to the irregularity detection circuit 100, for receiving the output voltage of the rectifying•smoothing circuit 33 may be provided so that both the output voltages of the rectifying•smoothing circuits 32 and 33 can be detected.

More specifically, the oscillation circuit 31 is designed to generate an oscillating voltage A having a frequency of several KHz and an amplitude of several volts. The oscillating voltage A is supplied to the coil 15 via a current limiting resistor R15 and the connector 22 and besides to the coil 16 via a current limiting resistor R16 and the connector 22. When alternating current flows through the coil 15, self-induction electromotive force is generated in the coil 15. Voltage B due to the electromotive force is detected as the terminal voltage on the side of the coil 15 of the resistor R15, which is equal to a voltage obtained by dividing the oscillating voltage A by a ratio of the resistance value of the resistor R15 to the inductance of the coil 15. In other words, the amplitude of the oscillating voltage B is approximately one over several times the oscillating voltage A and varies with the change of the inductance of the coil 15. Similarly, oscillating voltage B' detected as the terminal voltage on the side of the coil 16 of the resistor R16 is approximately one over several times the oscillating voltage A and varies with the change of the inductance of the coil 16. In a case where the connector 22 is separated from the circuit board 21, however, the connection between the coil 15 and the resistor R15 is broken, as is the connection between the coil 16 and the resistor R 16, whereby the alternating current is restrained from flowing via the resistors R15, R16 and the coils 15, 16. Therefore, the oscillating voltage supplied to one end of the resistors R15, R16 is transmitted without being divided. In this case, the oscillating voltage B and the oscillating voltage B' substantially conform to the oscillating voltage A; in other words, these voltages B and B' become several times greater than a voltage in a case where the connector 22 is normally connected to the circuit board 21.

The rectifying•smoothing circuit 32 includes a clamping circuit for receiving the oscillating voltage B so as to make the average voltage a predetermined reference voltage $V_{RE}$, a full-wave rectifier circuit for subjecting the output of the clamping circuit to full-wave rectification, and a smoothing circuit for smoothing and outputting the output of the full-wave rectifier circuit, the output of the smoothing circuit being output as a detection voltage C. In this case, the reference voltage $V_{RE}$ corresponding normally to the operating-point voltage of, for example, the differential amplifier 34 is such that, for example, half the supply voltage Vcc (vcc/2) is adopted. Thus a voltage signal corresponding to the amplitude of the oscillating voltage B is obtained with the reference voltage $V_{RE}$ as a reference; in other words, the detection voltage C corresponding to the inductance of the coil 15 is obtained. The detection voltage C is used as input signals on the inverted inputs of the differential amplifiers 34, 36.

The rectifying•smoothing circuit 33 is operated in the same manner as the rectifying•smoothing circuit 32 except that the former receives the oscillating voltage B' and outputs a detection voltage C'. With the reference voltage $V_{RE}$ as a reference, a voltage signal corresponding to the amplitude of the oscillating voltage B is then obtained. In other words, the detection voltage C' having a value corresponding to the inductance of the coil 16 is obtained. The detection voltage C' is used as input signals on the inverted sides of the differential amplifiers 34, 36.

Figure 4:
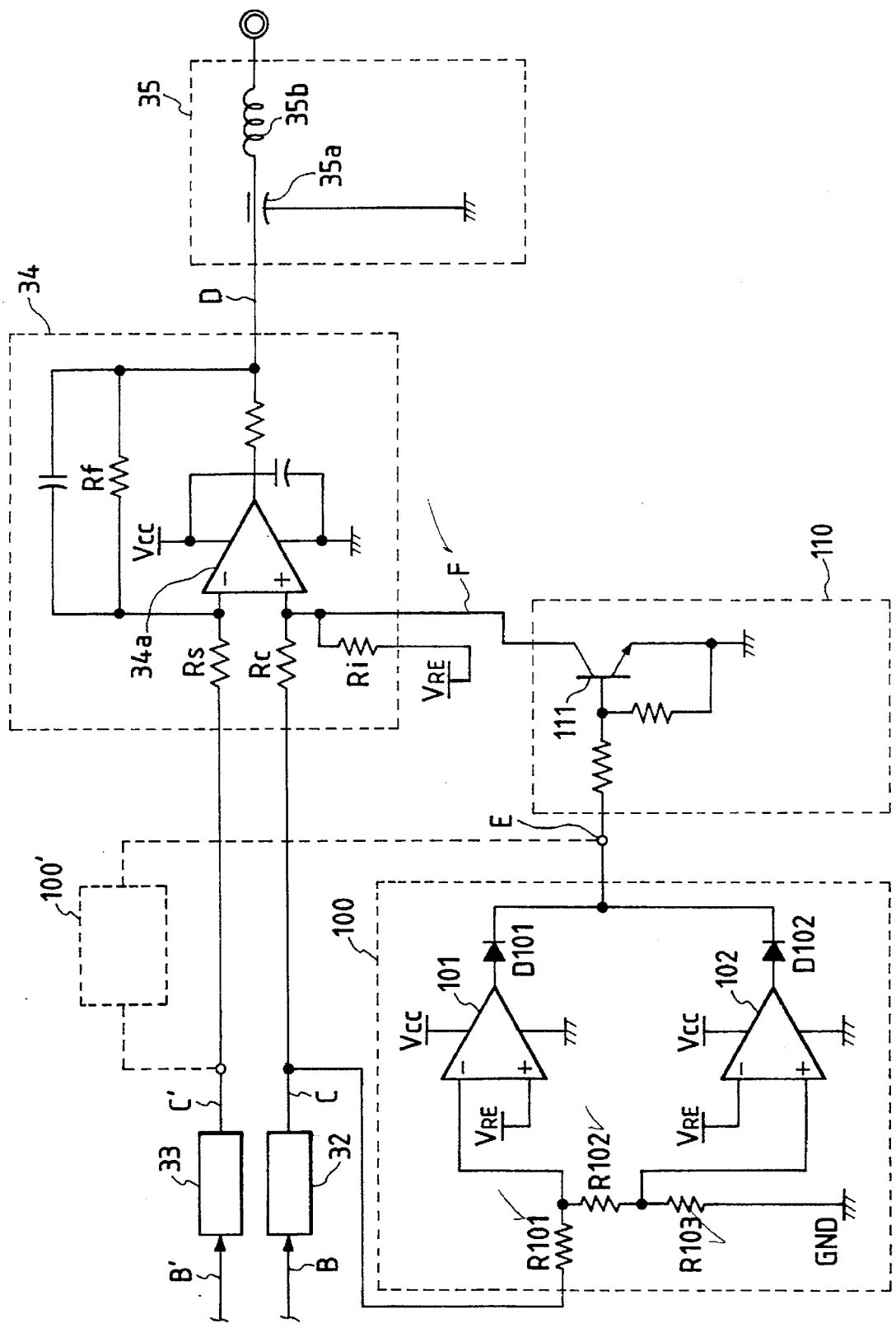
FIG. 4 is a circuit diagram showing mainly the irregularity detection circuit portion.

The differential amplifier 34 is mainly arranged with, for example, an operational amplifier 34a. As shown in FIG. 4 in detail, the operational amplifier 34a is such that a feedback resistor Rf is connected between the output and the inverted input terminal, that the line of the detection voltage C' is connected via a resistor Rs to the inverted input terminal and the line of the detection voltage C is connected via a resistor Rc to the non-inverted input terminal. In the operational amplifier 34a, further, the line of the reference voltage $V_{RE}$ is connected via a resistor Ri to the non-inverted input terminal, whereby the differential amplifier 34 operates with the reference voltage $V_{RE}$ as a reference, and also functions as a differential amplifier circuit for amplifying the difference between the detection voltage C and the detection voltage C' with the reference voltage $V_{RE}$ as a reference. The output D of the differential amplifier 34 as a torque detection signal is sent to a motor control circuit 40 via the noise eliminating filter 35.

The noise eliminating filter 35 includes a capacitor 35a and a coil 35b which are connected to the line of the output D of the differential amplifier 35 in series. In this case, the capacitor 35a is of a three terminal type for eliminating noise, the third terminal being connected to the sensor case 20 and so forth. Thus the noise which has been superposed on the line of the output D of the differential amplifier 34 and is coming from the outside, is eliminated.

Moreover, the differential amplifier 36 and the noise eliminating filter 37 are similar in not only construction but also function to the differential amplifier 34 and the noise eliminating filter 35. The output D' of the differential amplifier 36 is also sent as a torque detection signal to the motor control circuit 40 via the noise eliminating filter 37. Therefore, the circuit following the differential amplifier is doubled in the circuit 30 of the torque sensor, and both the outputs D, D' of the differential amplifiers 34, 36 are sent to the motor control circuit 40. The outputs D, D' conform in value to each other when the circuits following the differential amplifiers in the circuit 30 of the torque sensor remain normal.

The irregularity detection circuit 100 includes resistors R101, R102, R103 connected in series between the output of the rectifying·smoothing circuit 32. In other words the line of the detection voltage C and the ground GND, an operational amplifier 101 which functions as a comparator whose inverted input terminal is connected to the connection between the resistors R101, R102 and whose non-inverted input terminal is connected to the line of the reference voltage $V_{RE}$, an operational amplifier 102 which functions as a comparator whose non-inverted input terminal is connected to the connection between the resistors R102, R103 and whose inverted input terminal is connected to the line of the reference voltage $V_{RE}$, a diode D101 is connected to the output line of the operational amplifier 101 in series in the forward direction, and a diode D102 is connected to the output line of the operational amplifier 102 in series in the forward direction. Further, the output line of an irregularity detection signal E is connected to the connection between the cathode of the diode D101 and that of the diode D102.

The amplifier control circuit 110 is formed with a switching NPN transistor 111 whose base is connected via a current limiting resistor to the connection between the cathode of the diode D101 and that of the diode D102, whose collector is connected to the non-inverted input terminal of the operational amplifier 34a, and whose emitter is grounded. The amplifier control circuit 110 controls the output of the differential amplifier 34 by sending an amplifier control signal F to the differential amplifier 34 via the collector line of the transistor 111 connected to the non-inverted input terminal of the operational amplifier 34a.

Given that the value of the detection voltage C is $C_{MAX}$ when the slider 8 is moved from the neutral position to cover the maximum longitudinal distance on one side within the steady operating range to have the maximum inductance of the coil 15; the value of the detection voltage C is $C_{MIN}$ when the slider 8 is moved from the neutral position to cover the maximum longitudinal distance on the other side within the steady operating range to have the minimum inductance of the coil 15; an upper limit value $D_{MAX}$ is set slightly greater than the value $C_{MAX}$ in the range of the detection voltage C in the steady condition in consideration of temperature variations; and a lower limit value $D_{MIN}$ is set slightly smaller than the value $C_{MIN}$ therein. Then the values of the resistors R101, R102, R103 are determined so that the voltage generated at the connection between the resistors R102, R103 conforms to the reference voltage $V_{RE}$ when the detection voltage C is at the upper limit value $D_{MAX}$ and that the voltage generated at the connection between the resistors R101, R102 conforms to the reference voltage $V_{RE}$ when the detection voltage C is at the lower limit value $D_{MIN}$.

When the detection voltage C exceeds the upper limit value $D_{MAX}$, the voltage generated at the connection between the resistors R102, R103 becomes greater than the reference voltage $V_{RE}$, thus setting the output of the operational amplifier 102 at a high level. Subsequently, the output of the operational amplifier 102 is transmitted via the diode D102 to the base of the transistor 111. In other words, the irregularity detection signal E is sent out. On receiving this signal, the transistor 111 is turned on. Incidentally, the base voltage of the transistor 111 is unaffected by the output of the operational amplifier 101 due to the presence of the diode D101. When the transistor 111 is turned on, the collector line of the transistor 111, that is, the line of the amplifier control signal F is connected to the ground GND, thus forcing the non-inverted input of the operational amplifier 34a to be grounded. In this case, the output of the differential amplifier 34 is forced to be set at a low level as an output limit. In other words, the output of the differential amplifier 34 is forced by the irregularity detection circuit 100 and the amplifier control circuit 110 to be set at a low level outside the steady output range when the detection voltage C exceeds the predetermined upper limit value $D_{MAX}$.

When the detection voltage C becomes lower than the predetermined lower limit value $D_{MIN}$, the voltage generated at the connection between the resistors R101, R102 becomes lower than the reference voltage $V_{RE}$ and the output of the operational amplifier 101 is set to the high level. Further, the output of the operational amplifier 101 is transmitted via the diode D101 to the base of the transistor 111. In other words, the significant signal E is also sent at in this case. On receiving this signal, the transistor 111 is turned on. The base voltage of the transistor 111 is unaffected by the output of the operational amplifier 102 due to the presence of the diode D102. When the transistor 111 is turned on, the line of the amplifier control signal F is connected to the ground GND likewise, thus forcing the non-inverted input of the operational amplifier 34a to be grounded. Also in this case, the output of the differential amplifier 34 is forced to be set at a low level as an output limit. In other words, the output of the differential amplifier 34 is forced by the irregularity detection circuit 100 and the amplifier control circuit 110 to be set at a low level outside the steady output range when the detection voltage C becomes lower than the predetermined lower limit value $D_{MIN}$.

When the detection voltage C remains within the range of the lower limit value $D_{MIN}$ to the upper limit value $D_{MAX}$, the outputs of the operational amplifiers 101,102 are both at the low level and since the transistor 111 is in the OFF state, the collector line of the transistor 111 is in a high-impedance state, so that the operation of the differential amplifier 34 is unaffected by the irregularity detection signal E. Like the differential amplifier 36, the differential amplifier 34 in this case usually operates as a differential amplifier circuit for amplifying and outputting the difference between the output of the rectifying·smoothing circuit 32 and that of the rectifying·smoothing circuit 33.

The output of the torque sensor circuit 30, that is, the outputs D, D' of the differential amplifiers 34, 36 via the noise eliminating filters 35, 37 are sent to the motor control circuit 40. The motor control circuit 40 is provided with a displacement computing unit 41 for computing the direction and size of the displacement of the slider 8 from the neutral position according to, for example, the mean value of the outputs D, D' of the differential amplifiers 34, 36, a motor driving circuit 42 for obtaining the steering torque generated in the steering system according to the results of computation in the displacement computing unit 41 to supply driving current I to the electric motor 7 so as to generate auxiliary steering torque for use in reducing the steering torque, and an irregularity monitor circuit 43 for suspending the output operation of the motor driving circuit 42 by deciding the presence of irregularity in the torque sensor when, for example, the difference between both outputs of the differential amplifiers 34, 36 becomes greater than a predetermined value. The motor control circuit 40 may be placed separately from the circuit board 21 of the circuit 30 of the torque sensor or otherwise placed together with the circuit 30 of the torque sensor on the circuit board 21. In this case, the above predetermined value in the irregularity monitor circuit 43 is determined correspondingly by the difference between the differential amplifier 34 with the noise eliminating filter 35 and the differential amplifier 36 with the noise eliminating filter 37 in the steady state and besides its value is small.

The operation of the torque sensor according to the present invention will subsequently be described. An operation in a case where the connector is properly connected and the circuit 30 of the torque sensor is in proper condition, will be first described.

When the steering system is in a state to drive straight drive with no turns, the steering torque is zero. Additionally, no relative rotation occurs between the slider 8 rotating integrally with the output shaft 3 and the input shaft 2 since no relative rotation occurs between the input shaft 2 and the output shaft 3. Consequently, the ball 11 stays to take its initial position in the groove 2c, and the slider 8 is not moved from the neutral position as no force of advance or retreat is applied thereto.

When the steering wheel is turned to exert torque onto the input shaft 2, on the other hand, the torque is transmitted via the torsion bar 4 to the output shaft 3. At this time, resistance force corresponding to the frictional force between the steered wheel and the road surface, and the frictional force between the meshing gears of a rack—and—pinion type steering unit (not shown) on the left end side of the output shaft 3 is generated on the output shaft 3. Therefore, relative rotation which causes the output shaft 3 to delay occurs as the torsion bar 4 is twisted.

Then the slider 8 integral with the output shaft 3 in the rotational direction is subjected to relative rotation with respect to the input shaft 2. Since the ball 11 accommodated in the recess 9b of the cross guide 9 integral with the slider 8 is also housed in the groove 2c formed in the input shaft 2, the slider 8 is allowed to move back and forth axially in accordance with the tilted angle of the groove 2c. Although a small gap is provided between the ball 11 and the inner faces of the groove 2c and the recess 9b to allow the ball 11 to roll, the slider 8 is prevented from any backlash due to the gap because the slider 8 is urged unidirectionally by the spring 10.

In this case, providing that the relative rotation of the input shaft 2 and the output shaft 3 causes the slider 8 to move to the right of FIG. 1 when the right-hand steering torque (the steering torque generated at the time of steering in the right rotational direction) is generated, whereas the relative rotation of the input shaft 2 and the output shaft 3 causes the slider 8 to move to the left of FIG. 1 when the left-hand steering torque (the steering torque generated at the time of steering in the left rotational direction) is generated.

The large-diameter portion 8a has the property of readily passing magnetic flux therethrough in comparison with the ring members 12, 13. Thus, when the right-hand steering torque is generated, the self-induction electromotive force of the coil 15 increases and that of the coil 16 decreases since the self-inductance of the coil 15 increases and the self-inductance of the coil 16 decreases. On the contrary, when the left-hand steering torque is generated, the self-induction electromotive force of the coil 15 decreases and that of the coil 16 increases since the self-inductance of the coil 15 decreases and the self-inductance of the coil 16 increases.

Figure 5:
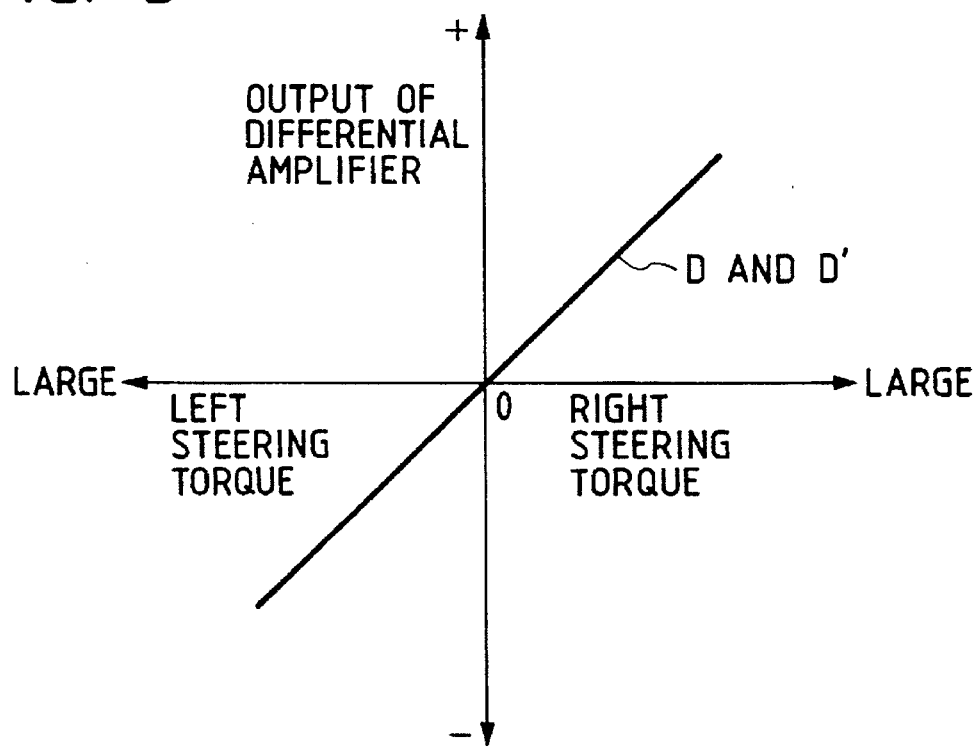
FIG. 5 is a graphic representation showing the relation between the steering torque in the steady operation condition and the outputs of the differential amplifiers.

The amplitude of the oscillating voltage B corresponding to the self-induction electromotive force of the coil 15 tends to decrease, whereas the amplitude of the oscillating voltage B' corresponding to the self-induction electromotive force of the coil 16 tends to increase. Further, the value of the detection voltage C decreases and that of the detection voltage C' increases accordingly. Moreover, the values of the detection voltages C, C' are both kept not lower than the value $D_{MIN}$ and not higher than the value $D_{MAX}$, that is, within the predetermined range (lower limit value $D_{MIN}$ - upper limit value $D_{MAX}$). Then the irregularity detection signal E of the irregularity detection circuit 100 is set to the low level, whereas the amplifier control signal F of the amplifier control circuit 110 is not set to the low level. Thus the operation of the differential amplifier 34 is unaffected by the irregularity detection signal E and the amplifier control signal F, and the differential amplifiers 34, 36 operate to compute the difference between the detection voltages C, C' and output the differences. As a result, the outputs of the differential amplifiers 34, 36 conform to each other and, as shown by D and D' of FIG. 5, linearly vary depending on the direction and size of steering torque. Since the difference between the rectifying•smoothing circuits 32, 33 is obtained in the differential amplifiers 34, 36, the variation of the self-inductance due to the temperature or the like is canceled.

The displacement computing circuit 41 in the motor control circuit 40 computes the mean value of the outputs of the differential amplifiers 34, 36 supplied via the noise eliminating filters 35, 37, obtains a displacement of the slider 8 by multiplying the value by a predetermined proportional gain, and sends out the result to the motor driving circuit 42. The motor driving unit 42 supplies to the electric motor 7 the driving current I whose direction and size correspond to the output of the displacement computing circuit 41 since the direction and size of the displacement of the slider 8 correspond to the direction and size of the steering torque.

Rotational force proportional to the direction and size of the steering torque caused to the steering system is generated in the electric motor 7, and the rotational force is transmitted to the output shaft 3 via the output shaft 7a, the worm 7b and the worm wheel 6, whereby the auxiliary steering torque is given to the output shaft 3. The driver's burden is thus reduced as the steering torque decreases.

Since the axial dimensional relation among the large-diameter portion 8a of the slider 8, the ring members 12, 13 and the coils 15, 16 are set as described previously, the ring members 12, 13 are prevented from totally intruding into the coils 15, 16 or from projecting outside, irrespective of their position in the whole longitudinal moving range of the slider 8. In other words, the outputs of the differential amplifiers 34, 36 shown in FIG. 5 always linearly vary and for this reason, the steering torque produced in the steering system becomes precisely detectable, irrespective of its size. Precise auxiliary steering torque can thus be given to the output shaft 3.

In a case where the conductive ring members 12, 13 made of non-magnetic material interlink an alternating field, an eddy current is produced therein so as to make the magnetic flux less transmissive. The members then have the property of making it more difficult to pass the magnetic flux through the member than through air. Since it is possible to render steep variations in the self-inductance of the coils 15, 16 in comparison with a case where no ring members 12, 13 are provided, the sensor sensitivity can be increased by making steep the outputs of the differential amplifiers 34, 36. On the contrary, the coils 15, 16 can be made more compact by decreasing the number of turns of coils 15, 16 on condition that the conventional sensor sensitivity is considered sufficient.

The magnetic flux transmitting through the ring members 12, 13 is concentrated on the outer layer close to the coils 15, 16 by the outer layer effect due to the eddy current. Incidentally, the thickness δ of the outer layer where the magnetic flux is concentrated is given by the following equation (1), where frequency of alternating current supplied to the coils 15, 16=f; permeability of the material forming the ring members 12, 13=μ; and the electrical conductivity=σ.

$$\delta = 2/(2\pi f \cdot \sigma \cdot \mu)^{1/2} \tag{1}$$

In other words, the thickness of the ring members 12, 13 in the diametrical direction should be not less than δ obtained from Eq. (1). The outer diameter dimension of the slider 8 is thus reduced accordingly.

Moreover, no oscillating coils are required because the torque sensor according to the present invention is of such a type that the self-inductance instead of the mutual inductance of the coil is to be varied. Therefore, two coils are sufficient even though differential is to be taken and this makes it possible to provide a compact, inexpensive torques sensor.

The operation of the torque sensor when the connector 22 is defectively connected will be subsequently described.

In a case where the connector 22 is defectively connected, both the coils 15, 16 are separated from the connection line between the resistors R15, R16 and the rectifying•smoothing circuits 32, 33. Consequently, the signal applied from the oscillation circuit 31 via the resistors R15, R16 to the rectifying•smoothing circuits 32, 33 remains unaffected even though the self-inductance of the coils 15, 16 varies through the movement of the slider 8 in accordance with the steering of the steering wheel. In this case, the oscillating voltage A from the oscillation circuit 31 is directly input to the rectifying•smoothing circuits 32, 33 via the resistors R16, R15 at all times. In other words, a signal whose amplitude is several times greater than that of the signal in the steady state in which the coils 15, 16 are connected is input to the rectifying•smoothing circuits 32, 33. Then, both the detection voltages C, C' as the outputs of the rectifying•smoothing circuits 32, 33 exceed the upper limit value $D_{MAX}$.

Figure 6:
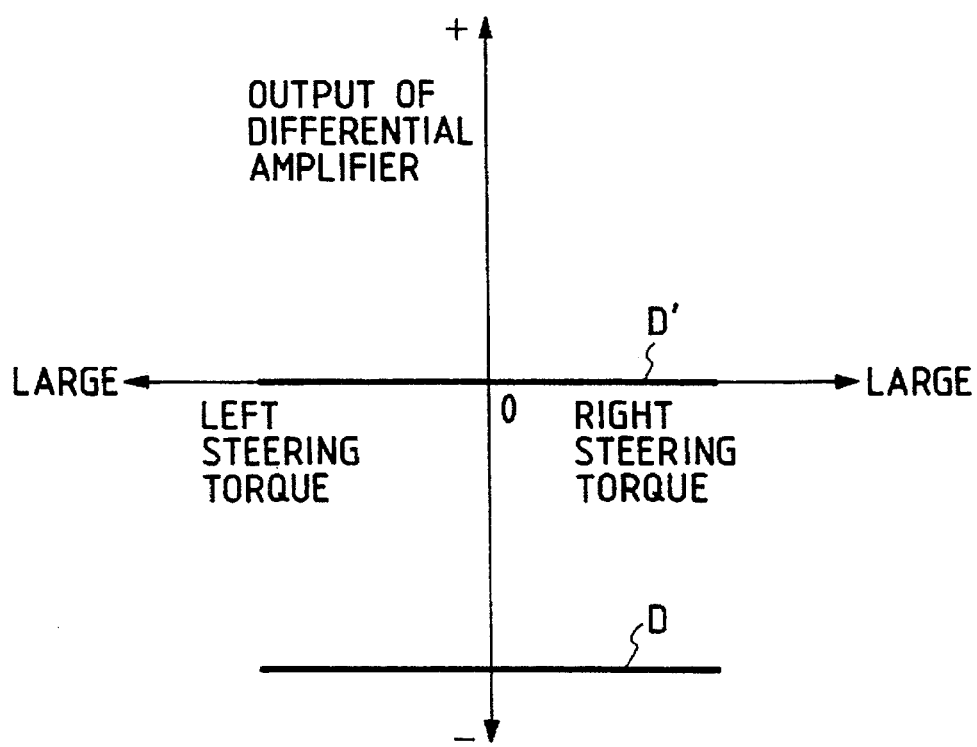
FIG. 6 is a graphic representation showing the relation between the steering torque in such a state that the connector is defectively connected and the outputs of the differential amplifiers.

The output D' of the differential amplifier 36 that has received the detection voltages C, C' becomes substantially zero with the reference voltage $V_{RE}$ as a reference since the detection voltages C, C' have an equal value (see D' of FIG. 6). On receiving the detection voltage C exceeding the upper limit value $D_{MAX}$, the irregularity detection circuit 100 sends the irregularity detection signal E at a significant high level to the amplifier control circuit 110 and on receiving this signal, the amplifier control circuit 110 sends the amplifier control signal F at a significant low level to the differential amplifier 34. Then the output D of the differential amplifier 34 whose non-inverted input terminal has received the amplifier control signal F at the low level is set to the low level of the amplifier output limit, irrespective of the values of the detection voltages C, C' (see D of FIG. 6). Thus the output D of the differential amplifier 34 is set to the low level outside the steady output range when the connector 22 is defectively connected, whereas the outputs D, D' of the differential amplifiers 34, 36 are at different voltage values.

The irregularity monitor circuit 43 in the motor control circuit 40 compares the outputs of the differential amplifiers 34, 36 supplied via the noise eliminating filters 35, 37, and suspends the operation of the motor driving circuit 42 by sending a stop signal or the like to the motor driving circuit 42 when the difference between both the outputs is greater than the predetermined value. Thus the steering wheel can be prevented from being locked because undesired auxiliary steering torque is produced when the torque sensor malfunctions, for example. Therefore, the outputs of the differential amplifiers may be used to decide that any irregularity has happened to the torque sensor when the connector 22 is defectively connected.

Although a description has been given of the operation in the case where the connector for connecting the coils to the circuit is defectively connected, this also applies to cases where the lead wire of the coil is broken partly because, for example, a coil yoke holding the coil is turned and where the lead wire of the coil is broken when the coils are loaded. When the terminal of the connector thus connected is in poor contact condition and when the lead wire of the coil is almost disconnected, moreover, substantially the same operation as stated above may be performed as the resistance value on the coil side increases. The irregularity detection circuit 100' similar to the irregularity detection circuit 100 may be connected to the rectifying•smoothing circuit 33 so that both the detection voltages C and C' can be detected at the same time. Although a detailed description will be omitted, irregularities such as the malfunction of the oscillation circuit 31 and the short-circuiting of the coils 15, 16 make the detection voltage C or detection voltages C and C' lower than the lower limit value $D_{MIN}$ and this results in setting the irregularity detection signal E of the irregularity detection circuit 100 or the irregularity detection circuits 100 and 100' to the significant high level and besides setting the amplifier control signal F of the amplifier control circuit 110 to the significant low level, whereby the output D of the differential amplifier 34 is set to the low level outside the steady output range. Thus the output of the differential amplifier circuit is usable for deciding the irregularity of the torque sensor like this.

Accordingly, the torque sensor according to the present invention is capable of deciding that there exist irregularities resulting from defectively connected coils and so forth including equal variations of the pair of detection voltages, by means of the output of the differential amplifier circuits.

Figure 7:
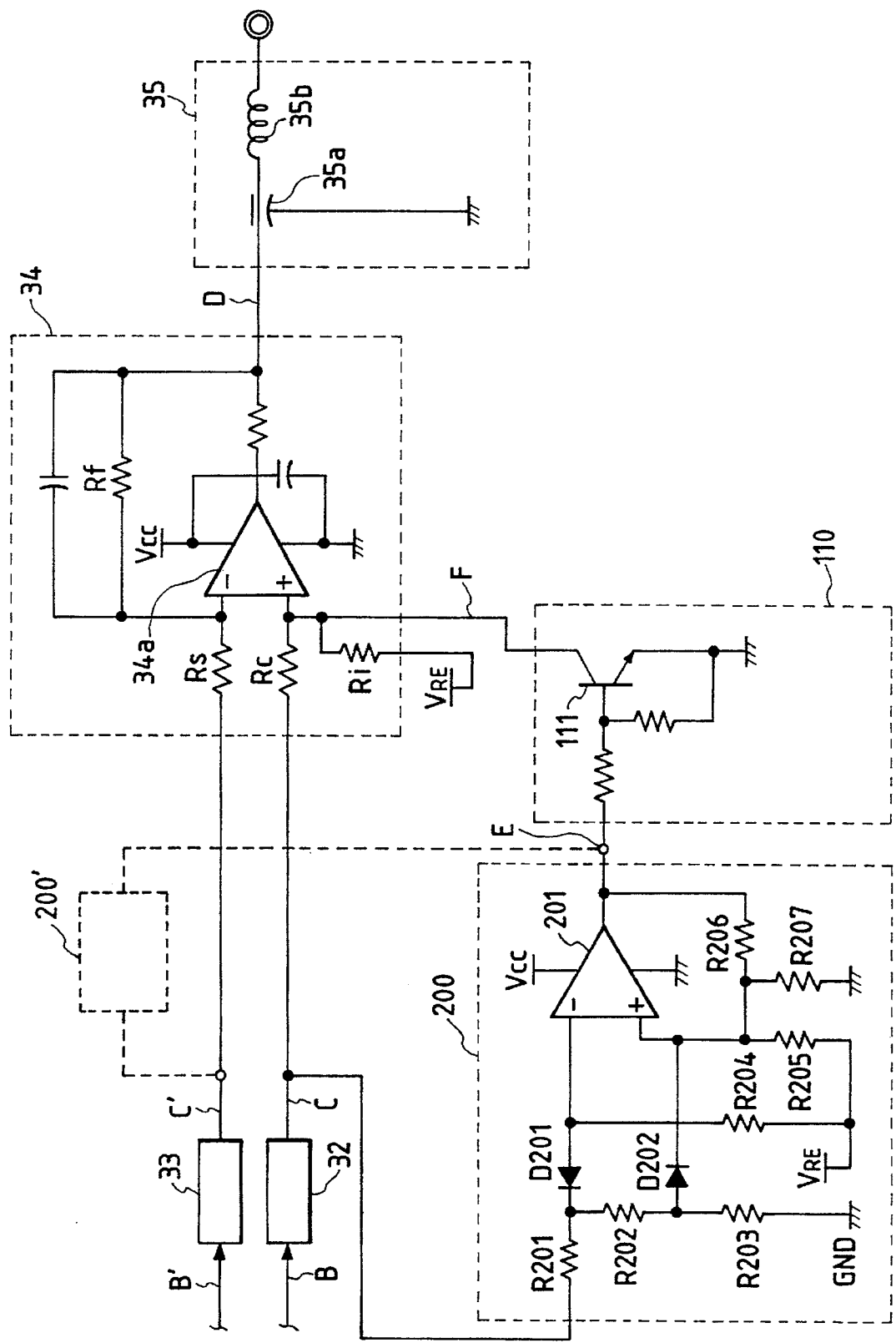
FIG. 7 is another irregularity detection circuit diagram embodying the present invention.

Another torque sensor embodying the present invention will now be described. This torque sensor is similar in not only mechanical construction but also circuitry to what has been shown in FIGS. 1 through 3 as the preceding embodiment of the invention excluding an arrangement of the irregularity detection circuit. Therefore, only points of difference will subsequently be described. FIG. 7 mainly shows an irregularity detection circuit 200 comprising resistors R201, R202, R203 connected in series between the output of a rectifying•smoothing circuit 32, that is, the line of detection voltage C and the ground GND, a diode D201 whose cathode is connected to the connection between the resistors R101, R102 and whose anode is connected to the line of the reference voltage $V_{RE}$ via a resistor R204, a diode D202 whose anode is connected to the connection between the resistors R102, R103 and whose cathode is connected to the line of the reference voltage $V_{RE}$ via a resistor R205, and an operational amplifier 201 whose inverted input terminal is connected to the anode of the diode D201 and whose non-inverted input terminal is connected to the cathode of the diode D202. The output of the operational amplifier 201 is used to send out the irregularity detection signal E.

With ignoring the forward voltage in the diode, the circuit 200 will be described as follows: When the voltage generated at the connection between the resistors R201, R202 is lower than the reference voltage $V_{RE}$, the voltage is made the inverted input of the operational amplifier 201 via the diode D201, whereas when the voltage generated at the connection between the resistors R201, R202 is higher than the reference voltage $V_{RE}$, the transmission of the voltage is cut by the diode D201, and the reference voltage $V_{RE}$ is made the inverted input of the operational amplifier 201. Further, when the voltage generated at the connection between the resistors R202, R203 is higher than the reference voltage $V_{RE}$, the voltage is made the non-inverted input of the operational amplifier 201 via the diode D202, whereas when the voltage generated at the connection between the resistors R202, R203 is lower than the reference voltage $V_{RE}$, the transmission of the voltage is cut by the diode D201, and the reference voltage $V_{RE}$ is made the non-inverted input of the operational amplifier 201. Thus the irregularity detection circuit having the same function as that of the irregularity detection circuit 100 as described above is attained with only one operational amplifier. In the irregularity detection circuit 200, resistors R206, R207 are used to divide the output of the operational amplifier 201 so as to effect positive feedback to the operational amplifier 201, so that the irregularity detection signal E is stabilized by providing a slight hysteresis characteristic to the operation as a comparator.

Another irregularity detection circuit 200' (shown by dotted line in FIG. 7) similar to the irregularity detection circuit 200 may be connected to the rectifying•smoothing circuit 33 so that both the detection voltages C and C' can be detected at the same time.

Although it has been arranged according to the above embodiment of the invention that the output of the differential amplifier circuit is set to have the predetermined low level value outside the steady output range when any irregularity is detected, it may also be acceptable to let the output of the differential amplifier circuit have the predetermined high level value outside the steady output range. This arrangement can be realized by, for example, sending out the irregularity detection signal E to the inverted input of the operational amplifier 34a.

In addition, though there are provided two systems including the differential amplifiers 34, 36 and the noise eliminating filters 35, 37 to improve reliability, more than two systems of that sort may be provided. Conversely, it is also acceptable to provide only one system including the differential amplifier 34 and the noise eliminating filter 35. In this case, although the output of the differential amplifier circuit 34 cannot be compared with that of another differential amplifier circuit, the irregular condition of the torque sensor can be determined by judging whether the output of the differential amplifier circuit 34 is within the steady output range.

Although a description has been given of the application of the torque sensor according to the above embodiments of the invention to a vehicle motor-driven power steering system, the present invention is not limited to those embodiments thereof.

Further, the present invention has been described as what is applicable to a torque sensor for measuring linear displacement. However, the present invention is not limited to such an application but may be applied to what is designed to detect angles.

Although it has been arranged according to the embodiments of the present invention that the large-diameter portion 8a made of magnetic material is held between the conductive ring members 12, 13 made of non-magnetic material, this relation therebetween may be reversed. For example, a small-diameter portion is conversely formed in a position where the large-diameter portion 8a of the slider 8 is formed and a conductive ring made of non-magnetic material may be fitted thereinto. Otherwise, a similar conductive slider 8 is made of non-magnetic material and ring members 12, 13 are formed of magnetic material. In this case, the latter arrangement is advantageous in that inertia is reducible as the mass of the whole member moving back and forth is also reducible as long as its dimensions are the same.

As set forth above, the torque sensor according to the present invention is such that, though the pair of detection voltages simultaneously have values exceeding the normal one in the presence of the coils defectively connected, the irregularity is detected by the detection circuit and further the control circuit forces the outputs of the differential amplifier circuits to vary into the predetermined value outside the steady output range, whereby the irregular state is reflected on the output subjected to differential amplification.

Accordingly, the present invention has the effect of making it possible to decide irregularities of defectively connected coils and so forth, which causes equal variations of the pair of detection voltages, by means of the output of the differential amplifier circuits.

What is claimed is:

1. A torque sensor, comprising:
    a pair of coils whose inductances vary in opposite directions to each other in accordance with torque;
    a first differential amplifier circuit for receiving and differentially amplifying a pair of detection voltages induced by said pair of coils, said torque being detected by means of an output of said differential amplifier circuit;
    a first detection circuit using one of said pair of detection voltages as an input voltage to output a first detection signal when said input voltage falls outside a range including a predetermined upper limit value and a predetermined lower limit value;
    a control circuit for controlling said first differential amplifier circuit on receiving said first detection signal from said first detection circuit so that said output of said first differential amplifier circuit has a predetermined value outside a steady output range; and
    a first rectifying-smoothing circuit for rectifying and smoothing one of said pair of detection voltages generated by one of said pair of coils to output a resulting signal to said first differential amplifier circuit and to said first detection circuit; and
    a second rectifying-smoothing circuit for rectifying and smoothing the other of said pair of detection voltages generated by the other of said pair of coils to output a resulting signal to said first differential amplifier circuit and to said first detection circuit.

2. A torque sensor as claimed in claim 1, further comprising a second detection circuit using the other of said pair of detection voltages as an input voltage to send out a second detection signal when said input voltage falls outside a range including a predetermined upper limit value and a predetermined lower limit value.

3. A torque sensor as claimed in claim 1, wherein said first predetermined upper limit value is greater than a maximum value of said one of said pair of detection voltages when one of said pair of coils has a maximum inductance, and said first predetermined lower limit value is smaller than a minimum value of said one of said pair of detection voltages when said one of said pair of coils has a minimum inductance.

4. A torque sensor as claimed in claim 2, wherein said first predetermined upper limit value is greater than a maximum value of said one of said pair of detection voltages when one of said pair of coils has a maximum inductance, said first predetermined lower limit value is smaller than a minimum value of said one of said pair of detection voltages when said one of said pair of coils has a minimum inductance, said second predetermined upper limit value is greater than a maximum value of the other of said pair of detection voltages when the other of said pair of coils has a maximum inductance, and said second predetermined lower limit value is smaller than a minimum value of the other of said pair of detection voltages when the other of said pair of coils has a minimum inductance.

5. A torque sensor as claimed in claim 1, further comprising:
an oscillation circuit for supplying an alternating voltage to said pair of coils;
a first rectifying•smoothing circuit for rectifying and smoothing said one of said pair of detection voltages generated by one of said pair of coils to output a resulting signal to said first differential amplifier circuit and to said first detection circuit;
a second rectifying•smoothing circuit for rectifying and smoothing the other of said pair of detection voltages generated by the other of said pair of coils to output a resulting signal to said first differential amplifier circuit; and
a noise eliminating filter for eliminating external noise components contained in said output of said first differential amplifier circuit.

6. A torque sensor as claimed in claim 2, further comprising:
an oscillation circuit for supplying an alternating voltage to said pair of coils;
a first rectifying•smoothing circuit for rectifying and smoothing said one of said pair of detection voltages generated by one of said pair of coils to output a resulting signal to said first differential amplifier circuit and to said first detection circuit;
a second rectifying•smoothing circuit for rectifying and smoothing the other of said pair of detection voltages generated by the other of said pair of coils to output a resulting signal to said first differential amplifier circuit and to said second detection circuit; and
a noise eliminating filter for eliminating external noise components contained in said output of said first differential amplifier circuit.

7. A torque sensor as claimed in claim 5, wherein said first detection circuit includes a first resistor, a second resistor and a third resistor connected in series between said first rectifying•smoothing circuit and a ground; a first operational amplifier which functions as a comparator whose inverted input terminal is connected to a connection point between said first resistor and said second resistor and whose non-inverted input terminal is connected to a line of a reference voltage; a second operational amplifier which functions as a comparator whose non-inverted input terminal is connected to a connection point between said second resistor and said third resistor and whose inverted input terminal is connected to said line of said reference voltage; a first diode connected to an output line of said first operational amplifier in a series in a forward direction; and a second diode connected to an output line of said second operational amplifier in series in a forward direction.

8. A torque sensor as claimed in claim 7, wherein said control circuit includes a switching NPN transistor whose base is connected to a connection point between a cathode of said first diode and a cathode of said second diode, whose collector is connected to said operational amplifier circuit, and whose emitter is grounded.

9. A torque sensor as claimed in claim 5, wherein said first detection circuit includes a first resistor, a second resistor and a third resistor connected in series between said first rectifying•smoothing circuit and a ground; a first diode whose cathode is connected to a connection point between said first resistor and said second resistor and whose anode is connected to a line of a reference voltage; a second diode whose anode is connected to a connection point between said second resistor and said third resistor and whose cathode is connected to said line of said reference voltage; and an operational amplifier whose inverted input terminal is connected to said anode of said first diode and whose non-inverted input terminal is connected to said cathode of said second diode.

10. A torque sensor as claimed in claim 1, wherein said first rectifying-smoothing circuit comprises:
a first clamping circuit for clamping said one of said pair of detection voltages;
a first full-wave rectifying circuit for subjecting an output of said first clamping circuit to full wave rectification; and
a first smoothing circuit for smoothing an output of said first full-wave rectifying circuit; and
wherein said second rectifying-smoothing circuit comprises:
a second clamping circuit for clamping the other of said pair of detection voltages;
a second full-wave rectifying circuit for subjecting an output of said second clamping circuit to full-wave rectification; and
a second smoothing circuit for smoothing an output of said second full-wave rectifying circuit.

11. A torque sensor, comprising:
a pair of coils whose inductances vary in opposite directions to each other in accordance with torque;
a first differential amplifier circuit for receiving and differentially amplifying a pair of detection voltages induced by said pair of coils, said torque being detected by means of an output of said differential amplifier circuit;
a first detection circuit using one of said pair of detection voltages as an input voltage to output a first detection signal when said input voltage falls outside a range including a predetermined upper limit value and a predetermined lower limit value;
a control circuit for controlling said first differential amplifier circuit on receiving said first detection signal from said first detection circuit so that said output of said first differential amplifier circuit has a predetermined value outside a steady output range; and
a rectifying-smoothing circuit for rectifying and smoothing one of said pair of detection voltages generated by one of said pair of coils to output a resulting signal to said first differential amplifier circuit and to said first detection circuit.

12. A torque sensor as claimed in claim 11, wherein said rectifying-smoothing circuit comprises:
a clamping circuit for clamping said one of said pair of detection voltages;
a full-wave rectifying circuit for subjecting an output of said first clamping circuit to full wave rectification; and
a smoothing circuit for smoothing an output of said full-wave rectifying circuit.

* * * * *